(12) United States Patent
Kohno et al.

(10) Patent No.: US 7,758,805 B2
(45) Date of Patent: Jul. 20, 2010

(54) HYDROGEN OCCLUSIVE ALLOY, HYDROGEN STORAGE FILM AND HYDROGEN STORAGE TANK

(75) Inventors: Tatsuoki Kohno, Tokyo (JP); Shin-ichi Orimo, Sendai (JP); Yuko Nakamori, Sendai (JP)

(73) Assignees: Kabushiki Kaisha Toshiba, Tokyo (JP); Tohoku University, Sendai-shi (JP)

( * ) Notice: Subject to any disclaimer, the term of this patent is extended or adjusted under 35 U.S.C. 154(b) by 612 days.

(21) Appl. No.: 11/689,086

(22) Filed: Mar. 21, 2007

(65) Prior Publication Data
US 2007/0231184 A1 Oct. 4, 2007

(30) Foreign Application Priority Data
Mar. 30, 2006 (JP) ............... 2006-095337

(51) Int. Cl.
C22C 30/00 (2006.01)
H01M 4/38 (2006.01)
(52) U.S. Cl. ............... 420/580; 420/900; 429/218.2
(58) Field of Classification Search ......... 420/402–414, 420/441–460, 580–589, 900; 429/218.2; 220/581–592
See application file for complete search history.

(56) References Cited

U.S. PATENT DOCUMENTS 5,506,069 A * 4/1996 Ovshinsky et al. ............ 429/59

FOREIGN PATENT DOCUMENTS

| JP | 2001-107165 | * | 4/2001 |
| JP | 2001-223000 | * | 8/2001 |
| JP | 2001-316744 | * | 11/2001 |
| JP | 2001-325957 | * | 11/2001 |
| JP | 2002-105562 | * | 4/2002 |
| JP | 2002-302733 | | 10/2002 |
| JP | 2003-73765 | | 3/2003 |

OTHER PUBLICATIONS

N. Takeichi et al., Hybrid hydrogen storage vessel, a novel high-pressure hydrogen storage vessel combined with hydrogen storage material, International Journal of Hydrogen Energy, vol. 28, (2003), p. 1121-1129.*

K. Aoki, et al., "Factors Controlling Hydrogen-Induced Amorphization of C15 Laves Compounds," Acta metall. Mater., vol. 40, No. 7, pp. 1717-1726, 1992.

Ping Chen, et al., "Interaction of hydrogen with metal nitrides and imides," Nature, vol. 420, Nov. 21, 2002, pp. 302-304.

* cited by examiner

Primary Examiner—George Wyszomierski
Assistant Examiner—Mark L Shevin
(74) Attorney, Agent, or Firm—Oblon, Spivak, McClelland, Maier & Neustadt, L.L.P.

(57) ABSTRACT

A hydrogen occlusive alloy has a cubic structure and a composition represented by the following general formula (1):

$$(Mg_{1-X}L_X)(Ni_{1-Y-Z}M_YLi_Z)_m \quad (1)$$

where the element L is at least one element selected from the group consisting of Na, Cs, Ca, Sr, Ba, Sc, Ti, Zr, Hf, V, Nb, Ta, Y, La, Ce, Pr, Nd, Pm, Sm, Eu, Gd, Tb, Dy, Ho, Er, Tm, Yb, and Lu, the element M is at least one element selected from the group consisting of Cr, Mo, W, Mn, Fe, Co, Pd, Pt, Cu, Ag, Zn, Cd, B, Al, Ga, In, Si, Ge, Sn, Pb, Sb and Bi, and mole ratios X, Y, Z and m are $0<X\leq0.5$, $0<Y\leq0.5$, $0.1\leq Z\leq 0.9$, and $1.8\leq m\leq 2.2$, respectively.

17 Claims, 2 Drawing Sheets

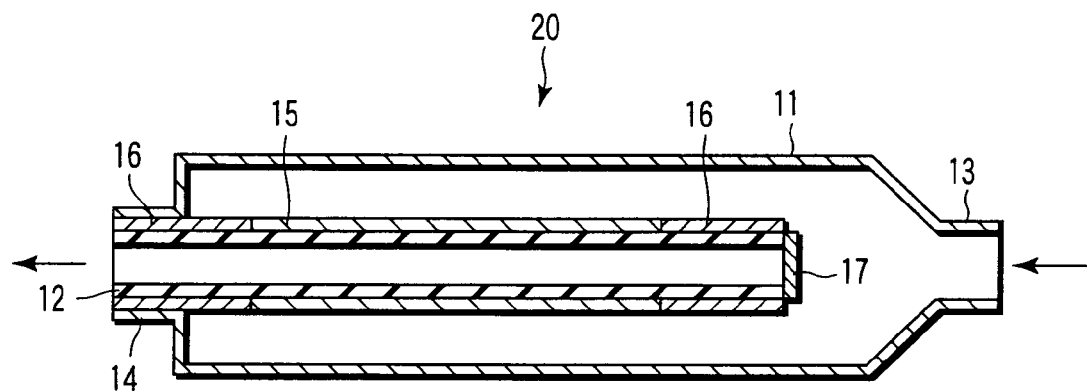
F I G. 2
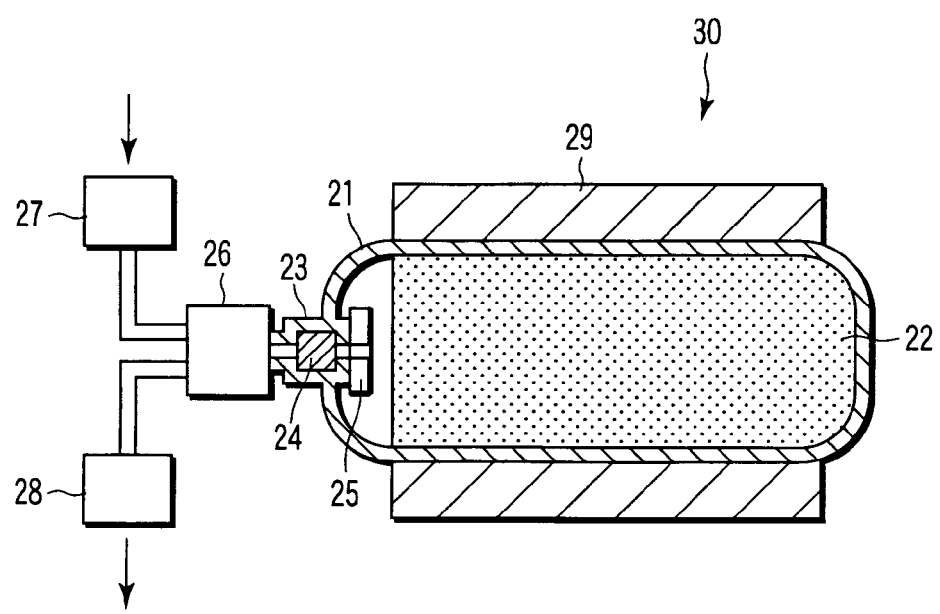
F I G. 3

HYDROGEN OCCLUSIVE ALLOY, HYDROGEN STORAGE FILM AND HYDROGEN STORAGE TANK

CROSS-REFERENCE TO RELATED APPLICATIONS

This application is based upon and claims the benefit of priority from prior Japanese Patent Application No. 2006-095337, filed Mar. 30, 2006, the entire contents of which are incorporated herein by reference.

BACKGROUND OF THE INVENTION

1. Field of the Invention

The present invention relates to a hydrogen occlusive alloy, a hydrogen storage film, and a hydrogen storage tank.

2. Description of the Related Art

Hydrogen occlusive alloys are alloys which store hydrogen as an energy source safely and easily. Therefore, hydrogen occlusive alloys have received much attention as a new energy conversion and storage material. The application field of hydrogen occlusive alloys as a new functional material covers a wide range, such as storage and transportation of hydrogen, storage and transportation of heat, conversion of heat-mechanical energy, separation and refinement of hydrogen, separation of hydrogen isotope, cells using hydrogen as an active material, catalysts in synthetics, and temperature sensors. As described above, hydrogen occlusive alloys are applicable to various fields such as mechanical, physical, and chemical fields, and mentioned as one of key materials in future industry.

There are cases where metal elements which exothermically react with hydrogen, that is, which form a stable compound with hydrogen are used alone as a metal which occludes hydrogen, and cases where these metal elements alloyed with other metals are used. Examples of metal elements which can be used alone are Pd, Ti, Zr, V, rare-earth metal elements, and alkaline-earth metal elements.

Alloying these elements produces many advantages. For example, not only occlusive reaction but also release reaction is performed relatively easily, by properly reducing the binding force between metal and hydrogen. Further, occlusion and release properties are improved, such as a magnitude of equilibrium hydrogen pressure (plateau pressure), the size of equilibrium area (plateau area), which are necessary for reaction, and change of equilibrium pressure (evenness) during occlusion of hydrogen. Furthermore, chemical and mechanical stabilities are improved.

Examples of hydrogen occlusive alloys which are known at present are magnesium-based alloys, such as $Mg_2Ni$, $MgNi_2$, Mg—Ni, magnesium-rare-earth alloys (such as $La_{1-x}Mg_xNi_2$ based alloys). In particular, it has been reported that magnesium-rare-earth alloys occlude a large amount of hydrogen gas.

However, these magnesium-based alloys have a disadvantage that they release very little amount of hydrogen and hardly function as a hydrogen storage material, although they occlude a large amount of hydrogen in gas phase.

U.S. Pat. No. 5,506,069 discloses that electrochemical hydrogen storage materials represented by (base alloy) aMb are amorphous or microcrystalline close to amorphous property, and thereby active regions of the materials increase due to irregularity of the framework. It discloses that a thin film using the electrochemical hydrogen storage material has a high energy density and high hydrogen storage capacity, and that a battery using the thin film has an improved stability of capacity. The base alloy is an alloy of Mg and Ni, and the ratio of Mg to Ni in the base alloy is from about 1:2 to about 2:1. M represents at least one modifier element selected from the group consisting of Co, Mn, Al, Fe, Cu, Mo, W, Cr, V, Ti, Zr, Sn, Th, Si, Zn, Li, Cd, Na, Pb, La, Mm, and Ca. b is greater than 0.5 atomic % and less than 30 atomic %. And the total of a and b is 100 atomic %.

JP-A 2002-302733(KOKAI) discloses a novel hydrogen occlusive alloy which has an excellent hydrogen release property at low temperature not exceeding 200° C. and incurs an inexpensive manufacturing cost. JP-A 2002-302733(KOKAI) discloses 0.01 to 20 mol % of at least one element selected from the group consisting of Li, B, C, Al, Si, Ca, Ti, Cr, Fe, Co, Cu, Zn, Nb, Ag, Sn, Pb, and misch metal elements is added to a hydrogen occlusive alloy containing Mg, Ni, Mn and inevitable impurities and having a composition ratio of $Mg_{3+a}Ni_{2+b}Ni_{1+c}$, where a ranges from −1 to 1, b ranges from −1 to 2, and c ranges from −0.45 to 2.

However, both of the electrochemical hydrogen storage material of U.S. Pat. No. 5,506,069 and the hydrogen occlusive alloy of JP-A 2002-302733(KOKAI) only release a little amount of hydrogen, and are not regarded as having an excellent hydrogen release property.

In the meantime, K. Aoki, X. G. Li and T. Matsumoto, Acta Metall Mater., 40, 1717 (1992) discloses that a part of hydrogen occlusive alloys having a C15 type Laves structure becomes amorphous or non-uniform due to occlusion of hydrogen.

BRIEF SUMMARY OF THE INVENTION

The object of the present invention is to provide a hydrogen occlusion alloy having an excellent hydrogen occlusion and release property, and a hydrogen storage film and a hydrogen storage tank using the same.

According to an aspect of the present invention, a hydrogen occlusive alloy has a cubic structure and a composition represented by the following general formula (1):

$$(Mg_{1-X}L_X)(Ni_{1-Y-Z}M_YLi_Z)_m \qquad (1)$$

where the element L is at least one element selected from the group consisting of Na, Cs, Ca, Sr, Ba, Sc, Ti, Zr, Hf, V, Nb, Ta, Y, La, Ce, Pr, Nd, Pm, Sm, Eu, Gd, Tb, Dy, Ho, Er, Tm, Yb, and Lu, the element M is at least one element selected from the group consisting of Cr, Mo, W, Mn, Fe, Co, Pd, Pt, Cu, Ag, Zn, Cd, B, Al, Ga, In, Si, Ge, Sn, Pb, Sb and Bi, and mole ratios X, Y, Z and m are $0<X\leqq0.5$, $0<Y\leqq0.5$, $0.1\leqq Z\leqq0.9$, and $1.8\leqq m\leqq2.2$, respectively.

According to another aspect of the present invention, a hydrogen storage film contains a hydrogen occlusive alloy having a cubic structure and a composition represented by the general formula (1).

According to another aspect of the present invention, a hydrogen storage tank comprises: a pressure vessel having an introducing port of hydrogen gas; and powder of a hydrogen occlusive alloy contained in the pressure vessel and having a cubic structure and a composition represented by the general formula (1).

BRIEF DESCRIPTION OF THE SEVERAL VIEWS OF THE DRAWING

FIG. 2 is a schematic cross-sectional view of a hydrogen separation device using a hydrogen storage film according to a second embodiment as a hydrogen separation film.

FIG. 3 is a schematic cross-sectional view of a hydrogen storage tank according to a third embodiment.

DETAILED DESCRIPTION OF THE INVENTION

Figure 1:
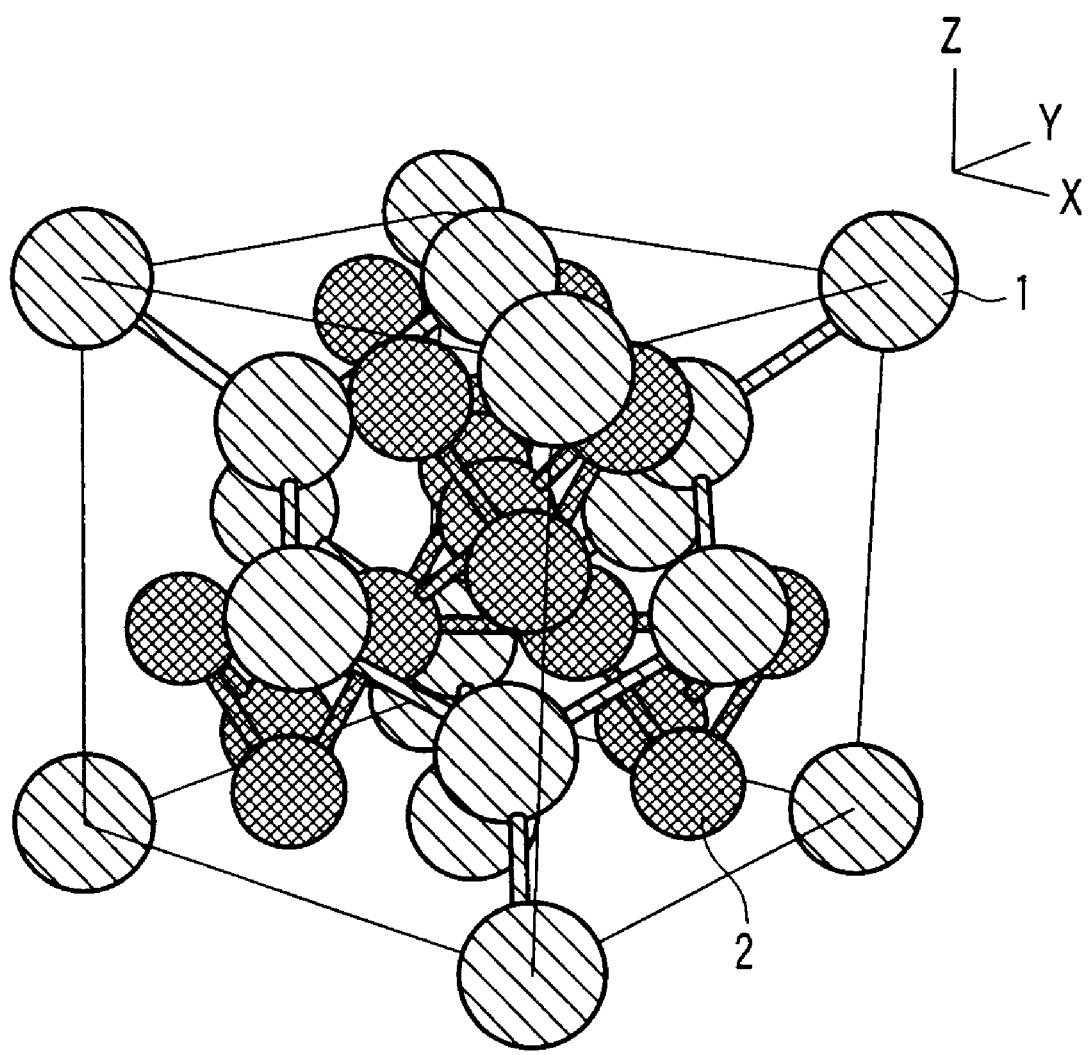
FIG. 1 is a schematic diagram of a crystalline structure of $MgCu_2$ type alloy.

The inventors of the present invention have performed diligent research to solve the above problem, and then obtained the following knowledge.

Specifically, the electrochemical hydrogen storage material of U.S. Pat. No. 5,506,069 has a metal texture being amorphous or microcrystalline close to amorphous texture, and thus is inferior in the hydrogen release property. On the other hand, the hydrogen occlusive alloy of JP-A 2002-302733(KOKAI) is an intermetallic compound having the basic composition of $Mg_3Ni_2Mn_1$, and the intermetallic compound occludes and releases hydrogen. The lattice constant of the alloy is 11 to 12 Å (1.1 to 1.2 nm). Even when Li is added to the alloy, it is the intermetallic compound $Mg_3Ni_2Mn_1$ which directly relates to occlusion and release of hydrogen. Such alloys generate stable hydrogen compounds in occlusion of hydrogen, and thus the hydrogen release amount thereof is very small, such as about 1.0 wt %. The inventors of the present invention have found that crystalline hydrogen occlusive alloys represented by the following general formula (1) and having a cubic structure suppress collapse of the crystalline structure due to occlusion and release of hydrogen, while maintaining a large hydrogen occlusion amount. Thereby, the hydrogen release property of hydrogen occlusive alloy has been remarkably improved. Further, it is also possible to improve the hydrogen occlusion and release cycle property of hydrogen occlusive alloys. The present invention is based on these findings.

Various embodiments of the present invention are described below with reference to drawings.

First Embodiment

A hydrogen occlusive alloy according to a first embodiment has a cubic structure and a composition represented by the following general formula (1).

$$(Mg_{1-X}L_X)(Ni_{1-Y-Z}M_YLi_Z)_m \quad (1)$$

In the formula (1), element L is at least one element selected from the group consisting of Na, Cs, Ca, Sr, Ba, Sc, Ti, Zr, Hf, V, Nb, Ta, Y, La, Ce, Pr, Nd, Pm, Sm, Eu, Gd, Tb, Dy, Ho, Er, Tm, Yb, and Lu. When reduction in the cost of the alloy is considered, at least one element selected from the group consisting of Ca, Ti, Zr, V, Nb, Ta and Y is preferably used as the element L, more preferably any of Ca, Ti, Zr, and V. When the hydrogen release property is considered, it is preferable to use at least one element as the element L selected from the group consisting of Ca, Hf, Sr and rare-earth elements (Y, La, Ce, Pr, Nd, Pm, Sm, Eu, Gd, Tb, Dy, Ho, Er, Tm, Yb, Lu).

The range of the mole ratio X is $0<X\leq0.5$. The hydrogen release property is remarkably improved by substituting part of Mg by the element L, that is, by setting the range of the mole ratio X to $0<X\leq0.5$. However, when the substitution amount by the element L (the mole ratio X) exceeds 0.5, the crystalline structure collapses in hydrogen occlusion and thereby the hydrogen release amount is badly reduced. A more preferable range of the mole ratio X is $0.1<X\leq0.4$.

In the above formula (1), the element M is at least one element selected from the group consisting of Cr, Mo, W, Mn, Fe, Co, Pd, Pt, Cu, Ag, Zn, Cd, B, Al, Ga, In, Si, Ge, Sn, Pb, Sb and Bi. Substituting part of Ni by the element M further improves the hydrogen occlusion and release properties of the alloy, such as hydrogen occlusion and release speed. It is considered that this is because substitution by the element M facilitates diffusion of hydrogen entering the alloy and hydrogen occlusion and release by the alloy. Preferably, the element M is at least one element selected from the group consisting of Co, Fe, Mn and Al. By using at least one of these elements, an alloy having a particularly excellent hydrogen release property is realized.

However, when the substitution amount by the element M (the mole ratio Y) exceeds 0.5, the crystalline structure collapses in hydrogen collusion, and thereby the hydrogen release amount is reduced. Therefore, the range of the substitution amount by the element M (the mole ratio Y) is set to $0<Y\leq0.5$. The of the mole ratio Y is more preferably $0.1<Y\leq0.4$.

Further, the amount of Li (the mole ratio Z) in the alloy is $0.1\leq Z\leq0.9$. When the mole ratio Z is less than 0.1, the crystalline structure become close to $MgNi_2$, and thus the hydrogen release amount is reduced, and an excellent hydrogen release property is not realized. On the other hand, when the mole ratio exceeds 0.9, the crystal lattices are too downsized, and hydrogen occlusion is very difficult. The range of the mole ratio Z is more preferably $0.2\leq Z\leq0.8$, and further preferably $0.25\leq Z\leq0.75$.

In the above formula (1), the ratio of $(Ni_{1-Y-Z}M_YLi_Z)$ to $(Mg_{1-X}L_X)$ (the mole ratio m) is $1.8\leq m\leq2.2$. Setting the mole ratio m within this range solves the problem that releasing hydrogen is difficult while maintaining a crystalline structure having an excellent hydrogen occlusion property. Consequently, it is possible to obtain a hydrogen occlusive alloy which can display a large hydrogen release amount. When the mole ratio m is less than 1.8, the crystalline structure collapses due to occlusion or release of hydrogen, and thus an excellent hydrogen occlusion and release property is not obtained. It is considered that the alloy with the mole ratio m set to 1.8 or more has a structure suitable for occlusion and release of hydrogen, and thus hydrogen is easily occluded. However, when the mole ratio m exceeds 2.2, the stability of the crystalline structure is reduced. The range of the mole ratio m is more preferably $1.9\leq m\leq2.1$.

Further, the hydrogen occlusive alloy according to the first embodiment may include inevitable impurities, being elements such as C, N, P, F, within a range of not inhibiting the property of the alloy. Each of these inevitable impurities preferably falls within the range of 1 wt % or less in the alloy.

The hydrogen occlusive alloy preferably has a cubic structure with a space group of Fd-3m. The hydrogen occlusive alloy having a cubic structure and symmetry of the space group can smoothly occlude and release hydrogen. Among them, the hydrogen occlusive alloy further preferably has a structure such as type A4, B32, C9, and C15.

In particular, the hydrogen occlusive alloy preferably has C15 Laves structure among the above. As disclosed in the above K. Aoki, X. G. Li and T. Matsumoto, Acta Metall Mater., 40, 1717 (1992), part of the hydrogen occlusive alloys having C15 Laves structure becomes amorphous or non-uniform due to occlusion of hydrogen. However, adopting the composition represented by the above formula (1) suppresses collapse of the crystalline structure due to occlusion of hydrogen, and enables easy occlusion and release of hydrogen. In the C15 Laves structure, an $MgCu_2$ structure being particularly symmetric is preferably adopted. FIG. 1 is a schematic diagram of a crystalline structure of $MgCu_2$ alloy. In FIG. 1, an Mg site 1 is indicated by a black circle, and a Cu site 2 is indicated by a white circle.

In the case of a hydrogen occlusive alloy represented by a general formula $[Mg(Ni_{1-X}Li_Z)_2]$, an Mg atom or an Li atom is located in each of the Mg site in FIG. 1, and an Ni atom or an Li atom is located in each of the Cu site 2. In the case of a hydrogen occlusive alloy represented by a general formula [Mg(Ni$_{1-Y-Z}$M$_Y$Li$_Z$)$_2$], an Mg atom or an Li atom is located in each of the Mg site in FIG. 1, an Ni atom or an Li atom is located in each of the Cu site 2, and some of the Ni atoms are substituted by atoms M. Further, In the case of a hydrogen occlusive alloy represented by a general formula [(Mg$_{1-X}$L$_X$)(Ni$_{1-Y-Z}$M$_Y$Li$_Z$)$_2$], an Mg atom or an Li atom is located in each of some Mg sites 1 in FIG. 1, an L atom is located in each of the other Mg sites 1, an Ni atom or an Li atom is located in each of the Cu site 2, and some of the Ni atoms are substituted by atoms M. As is clear from FIG. 1, such a crystalline structure has a particularly high symmetric property, and thus achieves smoother occlusion and release of hydrogen. Specifically, the particularly preferable alloy is an alloy which has an MgCu$_2$ structure and in which substitution is performed with the element L and M within the above range in a matrix having the mole ratio (Mg:Ni:Li) of Mg, Ni, and Li of 1:1:1.

Further, the hydrogen occlusive alloy according to the first embodiment preferably has a lattice constant within a range of 6.5 Å≦a≦7.5 Å (0.65 nm≦a≦0.75 nm). When the lattice constant a falls out of this range, it is difficult to generate crystalline lattices, and there is the possibility that a sufficient hydrogen occlusive property cannot be obtained. Therefore, a more preferable range of the lattice constant a is 6.7 Å≦a≦7.1 Å (0.67 nm≦a≦0.71 nm).

The hydrogen occlusive alloy of the first embodiment can be manufactured by, for example, the following method.

Specifically, elements of Mg, Ni, Li, element L, and element M are weighed to have the target composition, subjected to high-frequency-induced dissolution under inert atmosphere, and cast by a mold. An alloy ingot obtained thereby may be rapidly cooled. Instead of this, the following method may be adopted. Specifically, a matrix alloy having at least one of Mg, Ni, Li, element L and element M is manufactured by high-frequency-induced dissolution, each matrix alloy obtained is weighed to have a target composition and subjected to high-frequency-induced dissolution to manufacture an alloy ingot, and then the alloy ingot is rapidly cooled. The composition and the crystalline structure of the alloy obtained can be changed by adjusting the amount of each element and the heat-treatment conditions. For example, the obtained alloy is subjected to heat treatment for a relatively long time, for 1 to 100 hours, preferably 10 to 80 hours, at a temperature ranging from 100 to 1000° C. (1000° C. is excluded), preferably 100 to 800° C., under vacuum or inert atmosphere. By the heat treatment, an alloy having a C15 Laves structure with a space group of Fd-3m is obtained, and thereby the hydrogen occlusion and release property such as the hydrogen occlusion and release speed is particularly improved. When the heat treatment temperature reaches or exceeds 1000° C., the alloy phase may be separated, and the occlusion property may be badly reduced. The hydrogen occlusion and release properties of the obtained hydrogen occlusive alloy can be evaluated by differential temperature/thermogravimetric analysis.

Second Embodiment

The hydrogen occlusive alloy according to the first embodiment can be formed into a film shape. The hydrogen occlusive alloy having a film shape can function as a hydrogen storage film which displays an excellent hydrogen occlusive and release property.

The hydrogen storage film may contain alloys other than the hydrogen occlusive alloy. The hydrogen occlusive alloy preferably occupies a volume of at least 70 vol % in the hydrogen storage film. When the percentage of the hydrogen occlusive alloy is less than 70 vol %, a different phase may be precipitated with a large amount, and the performance as a hydrogen occlusive material may be deteriorated.

The hydrogen storage film is explained with reference to FIG. 2.

FIG. 2 is a schematic cross-sectional diagram of a hydrogen separating device using the hydrogen storage film according to the second embodiment as a hydrogen separation film.

A hydrogen separating device 20 illustrated in FIG. 2 comprises a high-pressure tube 11 and a low-pressure tube 12. One end of the high-pressure tube 11 has an opening portion with a gradually narrowed diameter, and the opening portion serves as a material gas introducing portion 13. The other end of the high-pressure tube 11 has an opening portion with a small diameter, and the opening portion serves as a refined gas outgoing portion 14. The low-pressure tube 12 is formed of, for example, a porous ceramic. A porous alumina is preferably used as the porous ceramic. A central portion of an outer surface of the low-pressure tube 12 is coated with a hydrogen separation film 15. Both end portions of the outer surface of the low-pressure tube 12, which are not coated with the hydrogen separation film 15, are coated with a metallic film 16. A metallic film having low reactivity with a mixed gas to be introduced is used as the metallic film 16. Further, one end of the low-pressure tube 12 is closed by a metallic film 17 similar to the metallic film 16. The hydrogen storage film containing the hydrogen occlusive alloy explained in the first embodiment is used as the hydrogen separation film 15.

The low-pressure tube 12 is inserted into the high-pressure tube 11 through the refined gas outgoing portion 14 of the high-pressure tube 11. In the high-pressure tube 11, the closed end of the low-pressure tube 12 faces the mixed gas (material gas) introducing portion 13, and the open end of the low-pressure tube 12 faces the refined gas outgoing portion 14. The external peripheral surface of the metallic film 16 covering the open end portion of the low-pressure tube 12 is in close contact with the internal peripheral surface of the refined gas outgoing portion 14 of the high-pressure tube 11.

When the hydrogen separating device 20 is used, a space between the low-pressure tube 12 and the high-pressure tube 11 is used as a high-pressure portion, and a space inside the low-pressure tube 12 is used as a low-pressure portion. A mixed gas containing hydrogen gas is supplied to the high-pressure portion through the material gas introducing portion 13. The hydrogen gas in the mixed gas is occluded by the hydrogen separation film 15. The hydrogen gas occluded by the hydrogen separation film 15 is transmitted through the wall surface of the low-pressure tube 12, and moves into the low-pressure portion. Thereby, refined hydrogen gas is recovered through the open end of the low-pressure tube 12 located inside the refined gas outgoing portion 14. The flow of the gas is indicated by arrows in FIG. 2.

The hydrogen storage film according to the second embodiment has an excellent hydrogen occlusion and release property, and thereby achieves excellent hydrogen separation efficiency when used as a hydrogen separation film.

Third Embodiment

The hydrogen occlusive alloy according to the first embodiment can be used in a powder form. The particles forming the powder are not limited to a specific shape. For example, the particles may have a spherical shape or may be flakes. Powder of the hydrogen occlusive alloy can be used as a filling material for a hydrogen storage tank which exhibits an excellent hydrogen occlusion and release property. The filling material may contain alloys other than the hydrogen occlusive alloy. The ratio of the hydrogen occlusive alloy and the other alloys may be the same as that explained in the second embodiment.

The hydrogen storage tank is described with reference to FIG. 3.

FIG. 3 is a schematic cross-sectional view of the hydrogen storage tank according to a third embodiment.

A hydrogen storage tank 30 comprises a pressure vessel (pressure-resistant vessel) 21, and a hydrogen occlusive material 22 filled into the pressure vessel 21 and serving as a filling material. Powder of the hydrogen occlusive alloy described in the first embodiment is used as the hydrogen occlusive material 22. The pressure vessel 21 has a hydrogen gas introducing port 23 provided with a tank valve 24. The hydrogen storage tank 30 can be incorporated into a hydrogen storage system mounted on a vehicle.

More specifically, as shown in FIG. 3, the pressure vessel 21 has an almost rectangular parallelepiped structure, and has a hydrogen storage space inside. The pressure vessel 21 is preferably formed of a material having a strength and a chemical stability which can endure the load caused by occlusion and release of hydrogen. Examples of the pressure vessel 21 are aluminum, stainless, and carbon structure materials. In the third embodiment, a stainless vessel is used as the pressure vessel 21. The introducing port 23 of the pressure vessel 21 is provided with the tank valve 24, to which a filter 25 is attached inside. Hydrogen supply and release to and from the pressure vessel 21 are performed through the tank valve 24. The tank valve 24 is connected with a hydrogen supply port 27 and a hydrogen release port 28 through pipes and the like. A pressure regulator 26 is provided on a connecting portion between the tank valve 24 and the pipes. The pressure regulator 26 regulates the pressure when hydrogen is supplied or released. The hydrogen occlusive material 22 serving as the filling material is fine powder and lightweight. Therefore, the filter 25 is provided to the tank valve 24 to prevent the hydrogen occlusive material 22 from being discharged to the outside of the pressure vessel 21.

When the hydrogen storage tank 30 is used, the tank valve 24 is opened, and then pressurized hydrogen gas is supplied through the hydrogen supply port 27. The hydrogen gas is occluded by the hydrogen occlusive material 22 filled in the pressure vessel 21. Thereafter, the tank valve 24 is closed and thereby the hydrogen gas is stored therein. When the hydrogen gas is to be released, the tank valve 24 is opened. Thereby, the pressure in the pressure vessel 21 is reduced, and the hydrogen gas is released from the hydrogen occlusive material 24. The hydrogen gas is released to the outside through the hydrogen release port 28. The flow of the gas is indicated by arrows in FIG. 3.

Heat is generated when hydrogen is occluded, and heat is absorbed when hydrogen is released. Therefore, a temperature regulator 29 may be provided on the outside of the pressure vessel 21, if necessary. The temperature regulator 29 enables improvement in the speed and the efficiency of hydrogen occlusion and release.

According to the structure described above, the size and the weight of the hydrogen storage tank 30 are reduced. Mounting the downsized and lightweight hydrogen storage tank 30 on a vehicle saves space and enables reduction in the weight of the vehicle.

Further, the hydrogen occlusive alloy of the third embodiment has an excellent occlusive and release property. By using powder of the hydrogen occlusive alloy as a filling material, the hydrogen storage tank 30 can function as a hydrogen storage tank which does not need addition of ultrahigh pressure.

The pressure vessel 21 can have various structures, other than the rectangular parallelepiped structure with a simple closed space. For example, ribs or columns may be provided inside the pressure vessel. Further, the hydrogen supply port 27 and the hydrogen release port 28 may be provided as one hydrogen supply and release port which has functions of the both.

EXAMPLE

Examples of the present invention are explained below.

Example 1

Manufacturing of Hydrogen Occlusive Alloy

Elements were weighed to have the composition shown in Table 1. Then, the elements were mixed and subjected to high-frequency dissolution under an argon atmosphere, and thereby an alloy ingot was obtained. Then, the alloy ingot was subjected to heat treatment at 350° C. for 50 hours under an argon atmosphere. The obtained alloy was crushed into powder with an average particle size of 100 μm or less, and thereby hydrogen occlusive alloy powder was manufactured. The composition of the obtained alloy powder was checked by ICP (high-frequency-induced coupling plasma) lightemission spectral analysis.

<Evaluation of Hydrogen Occlusion and Release Property>

The obtained alloy powder was set in the pressure vessel, and subjected to hydrogenation with a hydrogen pressure of 1.1 MPa at a temperature of 150° C. Further, the hydride powder was filled into a platinum plate, and subjected to differential heat/thermogravimetric analysis to evaluate the hydrogen occlusion and release property. The argon gas was used as atmosphere, and the hydrogen partial pressure was 0 (zero). The analysis conditions are explained below.

Specifically, the temperature was increased from room temperature to 300° C. with 1° C./min, and the maximum weight reduction amount was measured when reduction of weight was observed with the peak of heat absorption being release reaction. The value of the reduction amount represented by the ratio to the mass of the alloy powder before hydrogenation was used as the release percentage (wt %) of the occluded hydrogen. The result is shown in Table 1. It was confirmed by gas chromatography that the whole released gas was hydrogen gas.

<Evaluation of Crystalline Structure>

The crystalline structure of the obtained alloy powder was checked by subjecting the powder to X-ray diffraction measurement using CuKα rays and refinement.

As a result, the obtained hydrogen occlusive alloy was crystal having a C15 Laves structure with a space group of Fd-3m. The lattice constant a of the obtained hydrogen occlusive alloy was 6.98 Å (0.698 nm). Further, similar structure analysis was performed for the hydrogen occlusive alloy after subjected to differential heat/thermogravimetric analysis. The alloy had a C15 Laves structure with a space group of Fd-3m. Therefore, it was confirmed that the crystalline structure of the obtained hydrogen occlusive alloy did not collapse even after hydrogen occlusion and release.

Examples 2-17 and Comparative Examples 1, 2, 4-8

Hydrogen occlusive alloys thereof were obtained in the same manner as in Example 1, except that the element amounts thereof were changed to have the respective compositions of Table 1, and their hydrogen occlusion and release properties were evaluated. The results are shown in Table 1.

Comparative Example 3

Mg and Ni were weighted to have the composition shown in Table 1, mixed and treated by a planetary ball mill at 200 rpm for 200 hours, and thereby alloy powder was obtained. X-ray diffraction measurement thereof showed that the obtained alloy was an amorphous alloy. The hydrogen occlusion and release property of the alloy was evaluated in the same manner as in Example 1, except that the obtained alloy powder was used. The result is shown in Table 1.

Comparative Example 9

A hydrogen occlusive alloy was prepared in the same manner as in Example 1, except that the element amounts thereof were changed to have the composition of Table 1. When the structure analysis was performed for the obtained hydrogen occlusive alloy in the same manner as in Example 1, the lattice constant a was 11.55 Å (1.155 nm). The hydrogen occlusion and release property of the alloy was evaluated in the same manner as in Example 1, except that the obtained hydrogen occlusive alloy was used. The result is shown in Table 1.

hydrogen release percentages. Therefore, it was confirmed that the alloys of Examples 1 to 17 occluded and released a large amount of hydrogen, and had excellent hydrogen occlusion and release properties. Specifically, according to these alloys, it is possible to remarkably increase the effective hydrogen storage amount.

Further, the alloys of Examples 1 to 16 in which part of Mg was substituted by the element L displayed hydrogen occlusion and release properties more excellent than that of the alloy of Example 17 in which substitution was not performed.

In comparison with this, the hydrogen occlusive alloys of Comparative Examples 1 to 9 displayed hydrogen release percentages lower than those of Examples 1 to 17.

In Comparative Examples 1 and 2, it is considered that a stable hydride was formed after hydrogen occlusion because the alloys did not contain Li, although they had a cubic structure. This is considered to be the reason why the hydrogen release amounts of Comparative Examples 1 and 2 were reduced consequently, and thus the hydrogen release percentages were reduced.

In the Comparative Example 3, the obtained alloy was an amorphous alloy as disclosed in U.S. Pat. No. 5,506,069. This is considered to be the reason why both the hydrogen occlusion amount and the hydrogen release amount and the hydrogen release percentage of Comparative Example 3 were small.

The alloy of Comparative Example 4 has a mole ratio X exceeding 0.5, and a mole ratio Y less than 0.1. The alloy of Comparative Example 5 has a mole ratio Y exceeding 0.5. The alloy of Comparative Example 6 did not contain Ni. The alloy of the Comparative Example 8 has a mole ratio m exceeding 2.2. These are considered to be the reasons why the crystalline structures of the alloys of Comparative Examples 4, 5, 6 and

TABLE 1

| | Type of Hydrogen Occlusive Alloy | Hydrogen Release percentage (wt %) |
|---|---|---|
| Example 1 | $(Mg_{0.7}Ca_{0.3})(Ni_{0.5}Li_{0.5})_{2.0}$ | 4.2 |
| Example 2 | $(Mg_{0.8}La_{0.15}Zr_{0.05})(Ni_{0.4}Pt_{0.1}Co_{0.1}Li_{0.4})_{1.8}$ | 4.4 |
| Example 3 | $(Mg_{0.5}Ca_{0.3}La_{0.2})(Ni_{0.1}Mn_{0.1}Cr_{0.1}Cu_{0.1}B_{0.1}Li_{0.5})_{2.1}$ | 4.4 |
| Example 4 | $(Mg_{0.6}Y_{0.3}Ti_{0.1})(Ni_{0.1}Fe_{0.15}W_{0.05}Sn_{0.05}Mo_{0.03}Si_{0.02}Li_{0.6})_{2.0}$ | 4.3 |
| Example 5 | $(Mg_{0.7}Hf_{0.26}Sr_{0.03}Nb_{0.01})(Ni_{0.5}Al_{0.04}Pd_{0.1}Bi_{0.01}Pb_{0.05}Sb_{0.1}Li_{0.2})_{1.9}$ | 4.1 |
| Example 6 | $(Mg_{0.85}Cs_{0.1}Ti_{0.04}Ta_{0.01})(Ni_{0.5}Ag_{0.1}Cd_{0.06}B_{0.01}Ge_{0.01}Zn_{0.01}Ga_{0.01}Li_{0.3})_{2.0}$ | 4.0 |
| Example 7 | $(Mg_{0.75}Ce_{0.2}Sc_{0.05})(Ni_{0.3}Mo_{0.07}Co_{0.2}Bi_{0.03}Li_{0.4})_{2.1}$ | 4.1 |
| Example 8 | $(Mg_{0.7}Pr_{0.2}Na_{0.1})(Ni_{0.2}Sn_{0.4}Si_{0.1}Li_{0.3})_{2.2}$ | 4.3 |
| Example 9 | $(Mg_{0.5}Nd_{0.3}Lu_{0.2})(Ni_{0.2}Ge_{0.01}Co_{0.01}Pd_{0.09}Li_{0.6})_{2.0}$ | 4.1 |
| Example 10 | $(Mg_{0.6}Sm_{0.2}Ba_{0.2})(Ni_{0.4}Mn_{0.1}Pb_{0.1}Zn_{0.1}Ga_{0.1}Li_{0.2})_{2.1}$ | 4.3 |
| Example 11 | $(Mg_{0.87}Pm_{0.1}V_{0.03})(Ni_{0.7}Sn_{0.1}Cu_{0.06}Ag_{0.04}Li_{0.1})_{1.9}$ | 4.0 |
| Example 12 | $(Mg_{0.8}Eu_{0.1}Yb_{0.1})(Ni_{0.1}In_{0.05}Ag_{0.05}Li_{0.8})_{2.1}$ | 4.2 |
| Example 13 | $(Mg_{0.7}Gd_{0.2}Er_{0.1})(Ni_{0.2}Sn_{0.1}Ag_{0.1}Cd_{0.1}Ga_{0.08}B_{0.1}Li_{0.5})_{2.2}$ | 4.0 |
| Example 14 | $(Mg_{0.9}Tb_{0.05}Ca_{0.05})(Ni_{0.05}Al_{0.03}Co_{0.02}Pd_{0.01}Li_{0.9})_{1.8}$ | 4.2 |
| Example 15 | $(Mg_{0.9}Dy_{0.07}Tm_{0.03})(Ni_{0.3}Fe_{0.04}Zn_{0.03}Sb_{0.02}Pt_{0.01}Li_{0.6})_{2.0}$ | 4.1 |
| Example 16 | $(Mg_{0.6}Ho_{0.2}Ca_{0.2})(Ni_{0.2}Mn_{0.1}Ge_{0.1}Cu_{0.09}W_{0.01}Li_{0.5})_{2.1}$ | 4.0 |
| Example 17 | $Mg(Ni_{0.75}Li_{0.25})_{2.0}$ | 3.6 |
| Comparative Example 1 | $Mg_2Ni$ | 0.5 |
| Comparative Example 2 | $MgNi_2$ | 0.0 |
| Comparative Example 3 | $Mg_{50}Ni_{50}$ | 1.5 |
| Comparative Example 4 | $(Mg_{0.3}Ca_{0.7})(Ni_{0.5}Co_{0.05}Li_{0.45})_{2.0}$ | 2.1 |
| Comparative Example 5 | $(Mg_{0.8}La_{0.2})(Ni_{0.1}Sn_{0.6}Li_{0.3})_{2.0}$ | 2.5 |
| Comparative Exanple 6 | $(Mg_{0.9}Y_{0.1})Li_{2.0}$ | 2.2 |
| Comparative Example 7 | $(Mg_{0.8}Hf_{0.2})(Ni_{0.45}Al_{0.05}Li_{0.5})_{1.7}$ | 1.7 |
| Comparative Example 8 | $(Mg_{0.7}Ce_{0.3})(Ni_{0.4}Mn_{0.1}Li_{0.5})_{2.3}$ | 1.9 |
| Comparative Exanple 9 | $Mg_3Ni_2Mn_1$ | 1.0 |

As is clear from Table 1, the hydrogen occlusive alloys of Examples 1 to 17 having a cubic structure and the compositions represented by the general formula (1) displayed high 8 collapsed due to hydrogen occlusion, and their hydrogen release percentages decreased. Further, it is considered that the crystalline structure of the alloy of Comparative Example 7 collapsed due to hydrogen occlusion and the hydrogen release percentage thereof was decreased, because the alloy had a mole ratio m less than 1.8.

In Comparative Example 9, it is considered that a stable hydride was generated in hydrogen occlusion and the hydrogen release percentage thereof was decreased, because the obtained alloy was an intermetallic compound having a basic composition of $Mg_3Ni_2Mn_1$ structure as disclosed in JP-A 2002-302733(KOKAI).

As described above, the hydrogen occlusive alloy of the present invention has a remarkably improved property in comparison with the alloy of the prior art. Further, the hydrogen occlusive alloy of the present invention is applicable to storage and transportation of hydrogen, storage and transportation of heat, conversion of heat-mechanical energy, separation and refining of hydrogen, separation of hydrogen isotope, catalysts in synthetics, and temperature sensors. Thus, the hydrogen occlusive alloy of the present invention has a very high industrial value.

According to the present invention, it is possible to provide a hydrogen occlusive alloy having an excellent occlusion and release property, and a hydrogen storage film and a hydrogen storage tank using the hydrogen occlusive alloy.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A hydrogen occlusive alloy having a cubic structure and a composition represented by the following general formula (1):

$$(Mg_{1-X}L_X)(Ni_{1-Y-Z}M_Y Li_Z)_m \qquad (1)$$

where the element L is at least one element selected from the group consisting of Na, Cs, Ca, Sr, Ba, Sc, Ti, Zr, Hf, V, Nb, Ta, Y, La, Ce, Pr, Nd, Pm, Sm, Eu, Gd, Tb, Dy, Ho, Er, Tm, Yb, and Lu, the element M is at least one element selected from the group consisting of Cr, Mo, W, Mn, Fe, Co, Pd, Pt, Cu, Ag, Zn, Cd, B, Al, Ga, In, Si, Ge, Sn, Pb, Sb and Bi, and mole ratios X, Y, Z and m are $0<X\leq0.5$, $0<Y\leq0.5$, $0.1\leq Z\leq0.9$, and $1.8\leq m\leq2.2$, respectively.

2. The alloy according to claim 1, wherein a space group of the cubic structure is Fd-3m.

3. The alloy according to claim 1, wherein the cubic structure has a C15 Laves structure.

4. The alloy according to claim 1, wherein the range of the mole ratio X is $0.1<X\leq0.4$.

5. The alloy according to claim 1, wherein the range of the mole ratio Y is $0.1<Y\leq0.4$.

6. The alloy according to claim 1, wherein the range of the mole ratio Z is $0.2\leq Z\leq0.8$.

7. The alloy according to claim 1, wherein the range of the mole ratio Z is $0.25\leq Z\leq0.75$.

8. A hydrogen storage film containing a hydrogen occlusive alloy having a cubic structure and a composition represented by the following general formula (1):

$$(Mg_{1-X}L_X)(Ni_{1-Y-Z}M_Y Li_Z)_m \qquad (1)$$

where the element L is at least one element selected from the group consisting of Na, Cs, Ca, Sr, Ba, Sc, Ti, Zr, Hf, V, Nb, Ta, Y, La, Ce, Pr, Nd, Pm, Sm, Eu, Gd, Tb, Dy, Ho, Er, Tm, Yb, and Lu, the element M is at least one element selected from the group consisting of Cr, Mo, W, Mn, Fe, Co, Pd, Pt, Cu, Ag, Zn, Cd, B, Al, Ga, In, Si, Ge, Sn, Pb, Sb and Bi, and mole ratios X, Y, Z and m are $0<X\leq0.5$, $0<Y\leq0.5$, $0.1\leq Z\leq0.9$, and $1.8\leq m\leq2.2$, respectively.

9. The film according to claim 8, wherein the range of the mole ratio X is $0.1<X\leq0.4$.

10. The film according to claim 8, wherein the range of the mole ratio Y is $0.1<Y\leq0.4$.

11. The film according to claim 8, wherein the range of the mole ratio Z is $0.2\leq Z\leq0.8$.

12. The film according to claim 8, wherein the range of the mole ratio Z is $0.25\leq Z\leq0.75$.

13. A hydrogen storage tank comprising:
a pressure vessel having an introducing port of hydrogen gas; and
powder of a hydrogen occlusive alloy contained in the pressure vessel, and having a cubic structure and a composition represented by the following general formula (1):

$$(Mg_{1-X}L_X)(Ni_{1-Y-Z}M_Y Li_Z)_m \qquad (1)$$

where the element L is at least one element selected from the group consisting of Na, Cs, Ca, Sr, Ba, Sc, Ti, Zr, Hf, V, Nb, Ta, Y, La, Ce, Pr, Nd, Pm, Sm, Eu, Gd, Tb, Dy, Ho, Er, Tm, Yb, and Lu, the element M is at least one element selected from the group consisting of Cr, Mo, W, Mn, Fe, Co, Pd, Pt, Cu, Ag, Zn, Cd, B, Al, Ga, In, Si, Ge, Sn, Pb, Sb and Bi, and mole ratios X, Y, Z and m are $0<X\leq0.5$, $0<Y\leq0.5$, $0.1\leq Z\leq0.9$, and $1.8\leq m\leq2.2$, respectively.

14. The tank according to claim 13, wherein the range of the mole ratio X is $0.1<X\leq0.4$.

15. The tank according to claim 13, wherein the range of the mole ratio Y is $0.1<Y\leq0.4$.

16. The tank according to claim 13, wherein the range of the mole ratio Z is $0.2\leq Z\leq0.8$.

17. The tank according to claim 13, wherein the range of the mole ratio Z is $0.25\leq Z\leq0.75$.

* * * * *